March 29, 1966     E. A. LEACH     3,243,673
POWER CAPACITOR
Filed Feb. 17, 1964     3 Sheets-Sheet 1
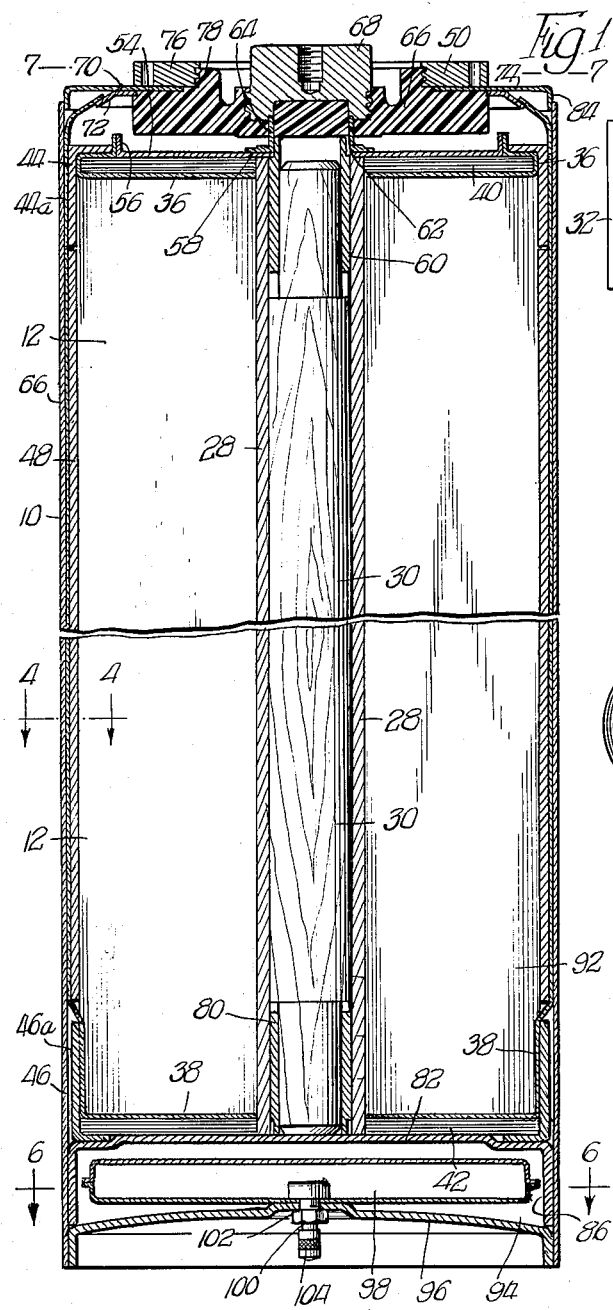
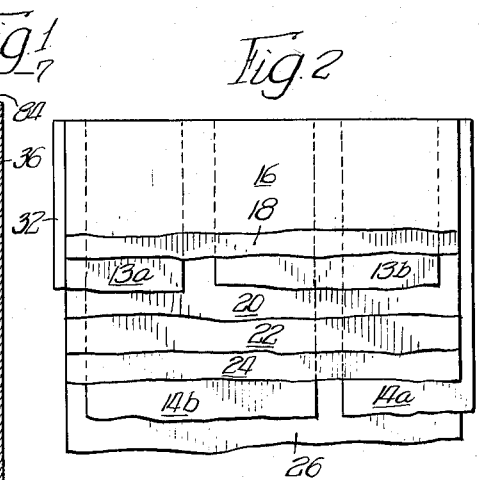
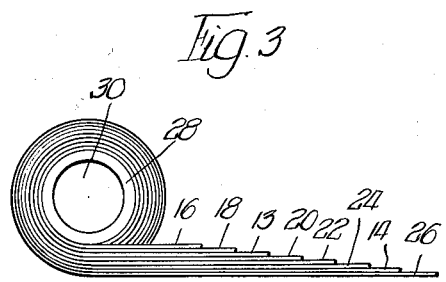
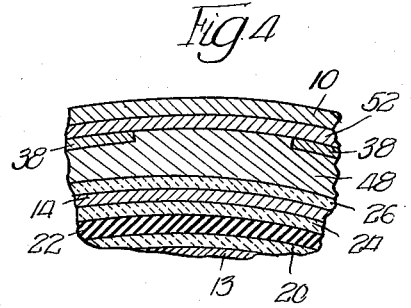
INVENTOR.
Edward A. Leach,
BY Brown, Jackson, Boettcher & Dienner
Attys.

March 29, 1966 E. A. LEACH 3,243,673
POWER CAPACITOR
Filed Feb. 17, 1964 3 Sheets-Sheet 2
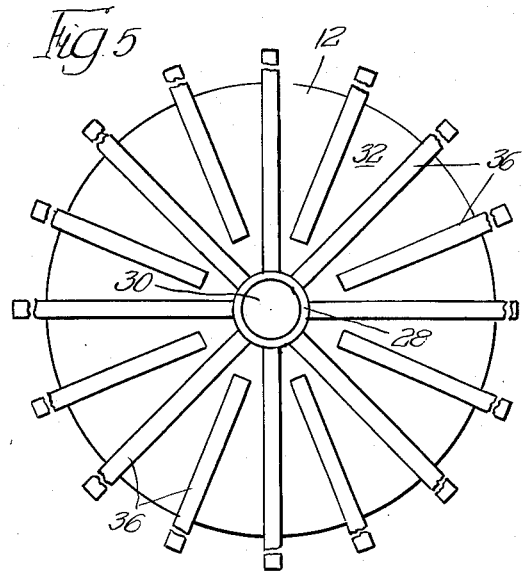
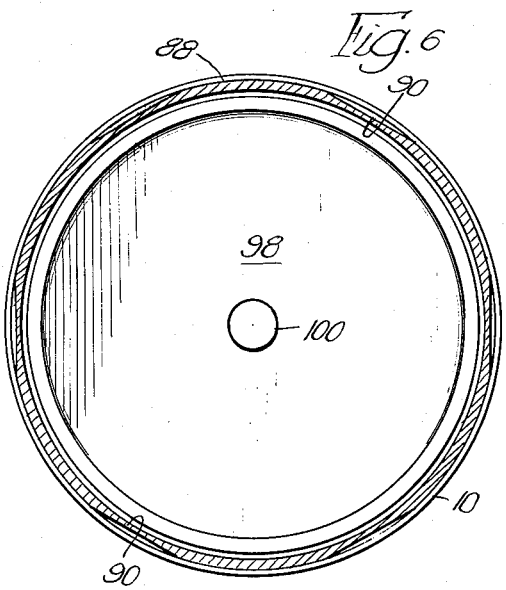
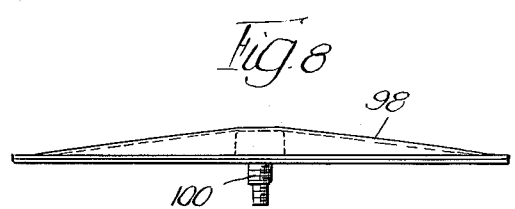
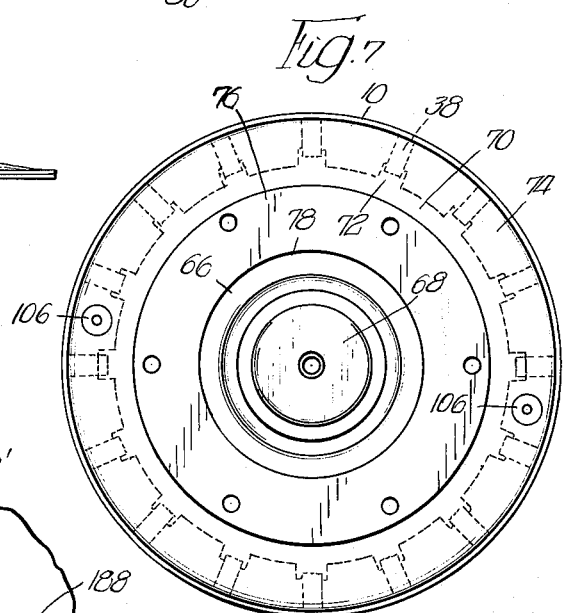
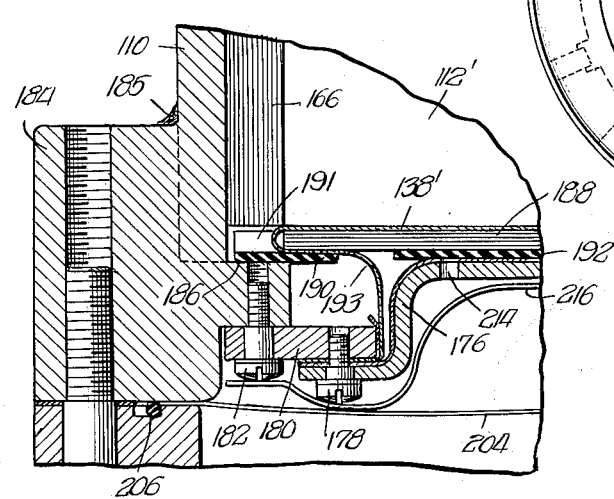
INVENTOR.
Edward A. Leach,
BY
Brown, Jackson, Boettcher
& Dienner
ATTYS

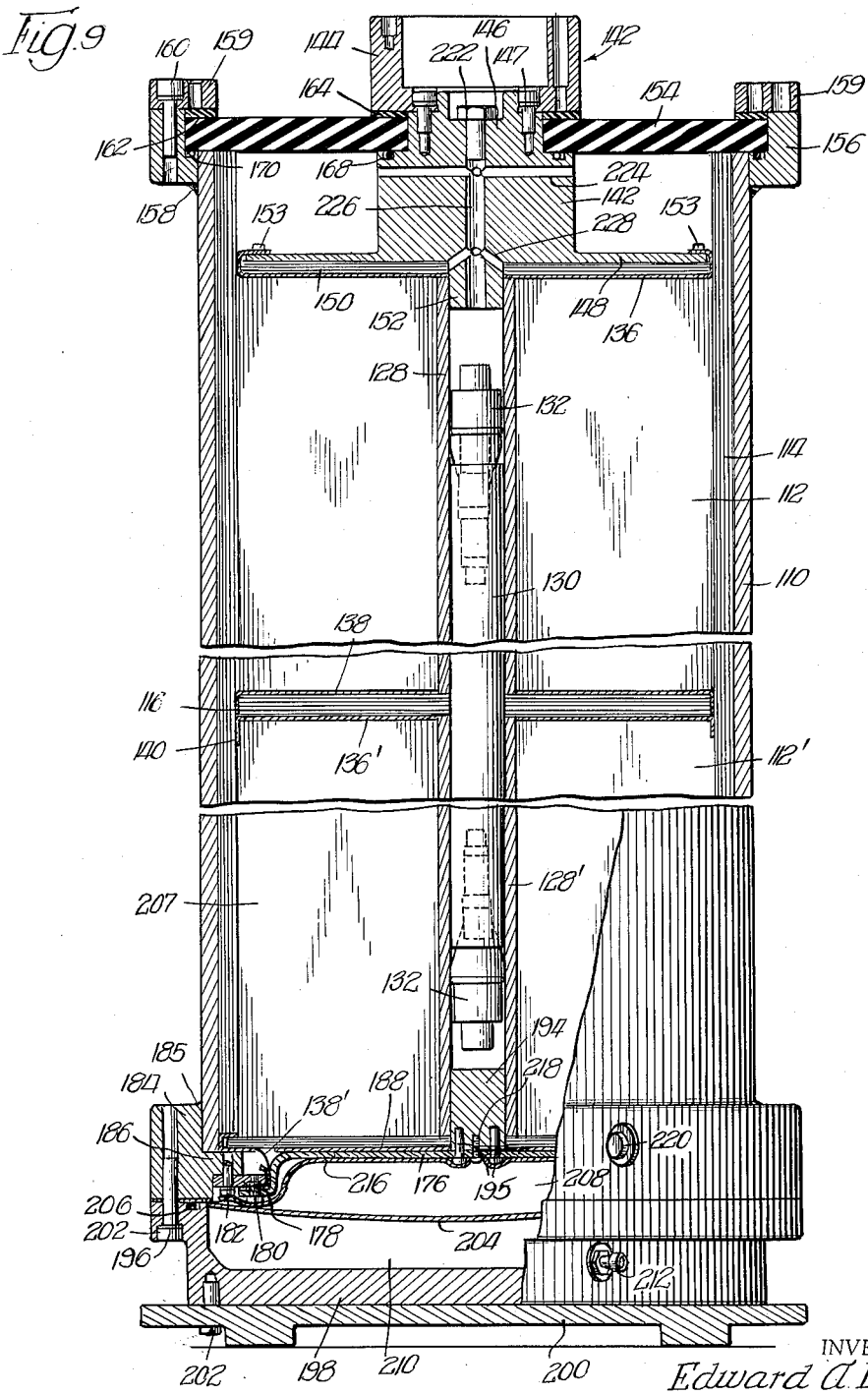

3,243,673
POWER CAPACITOR
Edward A. Leach, Springfield, Ill., assignor to Sangamo Electric Company, Springfield, Ill., a corporation of Delaware
Filed Feb. 17, 1964, Ser. No. 345,275
10 Claims. (Cl. 317—244)

This invention relates to high energy storage capacitors intended for use in high Q ringing discharge applications and contemplates a novel and improved construction of container for encasing the cooperating armatures and dielectric spacer.

In the copending application of Paul S. Hoffman and William M. King, Serial No. 309,993, filed September 19, 1963, and assigned to my assignee there is disclosed a novel construction of dielectric spacer consisting of porous layers of reconstituted mica interleaved with a thickness of irradiated polyethylene. This spacer is interposed between flexible foils of electrically conducting metal such as aluminum, copper, tantalum, lead and the assembly is convolutely wound about a cylindrical arbor and sealed within a metal container. However, before sealing, the air content is evacuated from the container and replaced with a dielectric liquid such as castor oil so as to thoroughly impregnate the assembly and eliminate voids within the interior of the container. The result is a capacitor of surprisingly high Q in the order of 600 at operating voltages of at least 3,000 and up to and even in excess of 60,000 volts through a frequency range of 30–100 kilocycles. Such a capacitor furthermore has been demonstrated to have a relatively long life when compared with wound capacitors employing kraft paper and/or solid dielectrics. The polyethylene it was found provides mechanical strength while the reconstituted mica being porous provides a high dielectric constant, a webbing about and between the polyethylene and foil which accommodates the desired thorough impregnation of the wound assembly by the dielectric liquid and eliminates voids which would contribute to corona damage at the mentioned operating voltages and frequencies. It also has been found that a truly round arbor also improves the operation and life of the capacitor because it eliminates sharp folds in the dielectric material during winding which would also contribute to corona damage in a capacitor operating at said high voltage levels.

Further improvement in such a capacitor is made by maintaining the dielectric liquid free of water, water vapor or dissolved gases and this is best done by properly preparing the capacitor prior to impregnation, exercising extreme care during the impregnation process and completely filling the enclosure with liquid dielectric.

I have found that still further improvements in such a capacitor can be obtained by pressurizing the interior of the sealed container. Thus I have found that if a pressure equal to several atmospheres is exerted on the dielectric liquid this will usefully raise the corona threshold voltage of the capacitor. For example, a pressure of 60 p.s.i.g. on the dielectric liquid will raise the corona threshold voltage in a capacitor as much as 50 or 60% above that of the same capacitor having its dielectric liquid under pressure of one atmosphere. The direct result thereof is that the capacitor can be successfully stressed to higher potentials and at the same time also improves its life capability with respect to number of discharge cycles.

One of the problems incurred in completely filling the enclosure with liquid and effecting pressurization of the interior of a capacitor was to allow for the volumetric expansion of the dielectric liquid which occurs with normal rise in temperature which accompanies operation of the capacitor. Not only must the capacitor case or container be capable of withstanding the elected internal pressure but it must also be capable of accepting the liquid volumetric changes (caused by temperature changes) which occur during usage or shipment. Beyond this the developed pressure must not exceed the mechanical strength of the case. Simultaneously therewith, it is essential that all live parts of the capacitor remain completely covered with the dielectric liquid, that the dielectric liquid fill all voids within the enclosure, that the dielectric fluid remain a liquid with no dissolved gas and that all air or other gas be excluded from contact with the liquid.

It is a feature and principal object of this invention therefore to improve upon known capacitors including the aforedescribed invention of King and Hoffman by providing a construction of container for an assembly of dielectric and cooperating foils or armatures which is adapted to maintain a relatively constant hydrostatic pressure on the dielectric liquid content of the capacitor.

In accomplishment thereof, the present invention provides a novel construction of capacitor case in which the interior of the case comprises two mechanically adjacent cavities. One of these encloses the capacitor section comprising the conductive foils and dielectric spacer; the other contains a collapsible reservoir which in one form of the invention is a bladder constructed of Teflon or other resilient material inert to the selected dielectric material. The bladder is connected to outside of the capacitor through a suitable valve which serves as means by which it may be inflated with air or a more appropriate gas, such as dry nitrogen. Although the two chambers are mechanically separated, provision is had for passage of dielectric liquid between the two chambers and the liquid is not permitted contact with the gas.

After the capacitor has been dried by the use of heat and vacuum and completely filled with the dielectric liquid, the bladder is inflated with gas to displace a measured volume of the dielectric liquid. The capacitor is then hermetically sealed. The volume of liquid removed in this manner is chosen to leave sufficient liquid in the chamber surrounding the bladder to exceed the expected volumetric decrease in liquid for the lowest operating temperature the capacitor is expected to encounter. After the hermetic seal off, the bladder is inflated with gas (preferably dry nitrogen) to the desired internal pressure, preferably between 45 and 60 p.s.i.g., the gas in the bladder thereby exerting a corresponding hydrostatic pressure on the dielectric liquid in the capacitor. Should the temperature of the capacitor rise above the temperature at which it was sealed off, the volume of the dielectric liquid within the chambers of the capacitor case will increase. As this occurs, the liquid compresses the bladder and reduces its volume. Since the bladder is inflated with gas, its internal pressure will change inversely in proportion to the change in volume. By design, the bladder volume is considerably greater than the expected volumetric change of the dielectric liquid content of the capacitor. Hence, the change in pressure within the bladder will be relatively small for all normal conditions of working temperatures.

A feature of a capacitor case in accordance with the present invention is therefore that a relatively constant internal pressure is maintained within the capacitor.

A further feature of the invention is that it keeps the capacitor assembly under pressurized dielectric liquid irrespective of how the conductive foils and dielectric spacers are mounted therein and irrespective of the position or attitude of the enclosure.

Another feature of the invention is that a capacitor case is obtained which may be completely filled with dielectric liquid out of contact with any gas or vapor.

Still another feature is that the aforesaid objects, advantages and/or features are obtained in a capacitor case which is entirely practical as well as simple and economical to construct.

Instead of an inflatable bladder, other forms of a collapsible reservoir are possible in accordance with the invention. For example, the second chamber may be divided by a resilient non-porous membrane into a pair of cavities only one of which has communications with the first chamber to receive dielectric liquid therefrom. The second cavity will be adapted through a suitable valve connection for filling with air or gas to the desired internal pressure and its resilient wall will act like the walls of the inflated bladder to exert pressure on the dielectric liquid contacting the side thereof opposite that containing the gas. Thus with temperature rises in the capacitor, it will similarly accommodate volumetric changes brought about by contraction and expansion of the dielectric liquid in response to temperature variations. Thus in accordance with this alternative arrangement all of the above recited features and advantages of the invention are also obtained but in a construction of case which may be considered possibly more durable and convenient to construct.

Many other objects, advantages and/or features of a capacitor constructed in accordance with the invention will be at once or will become apparent when considered in light of the disclosure of preferred embodiments of the invention which follow.

Referring now to the several views comprising the accompanying drawings:

FIGURE 1 is a longitudinal sectional view taken through a capacitor constructed in accordance with the invention and illustrating the first mentioned form of the invention;

FIGURE 2 is a view which illustrates one arrangement of the armature construction, flexible metal foils and dielectric spacer sheets which comprise the capacitor assembly;

FIGURE 3 illustrates how said assembly is wound about its supporting arbor prior to insertion into the capacitor case;

FIGURE 4 is a fragmented sectional view taken along lines 4—4 of FIGURE 1 and illustrated greatly enlarged;

FIGURE 5 is an end view taken of the capacitor assembly before readied for insertion into its container and illustrates the straps employed for electrically connecting the foils thereof to the electrodes;

FIGURE 6 is a section taken through the capacitor case along lines 6—6 of FIGURE 1 looking in the direction indicated by the arrows;

FIGURE 7 is an end view of the capacitor case as viewed from the position indicated by lines 7—7 of FIGURE 1;

FIGURE 8 is a view of the bladder, uninflated, and before being assembled in the capacitor case;

FIGURE 9 is a view partially in section and illustrating the second embodiment of the invention; and FIGURE 10 is an enlarged sectional view taken through the area identified as 10 in FIGURE 9.

Referring now specifically to the individual views wherein like parts are identified by like reference numerals, FIGURE 1 illustrates one embodiment of the invention wherein 10 is a cylindrical casing of rigid steel or other appropriate metal into which is located a capacitor assembly indicated generally as 12. Such a capacitor assembly will comprise a pair of electrically-conductive metal foils separated by a thickness of dielectric solid material and arranged in a roll about a cylindrical arbor. Preferably the dielectric spacer will be as described and claimed in the aforementioned Hoffman and King application, Serial No. 309,993.

Referring therefore to FIGURES 2 and 3, a capacitor assembly constructed in accordance with the invention embodies spaced layers 13 and 14 of electrically-conductive flexible metal foil such as aluminum, copper, lead or tantalum, and between which is sandwiched a multiple-layer dielectric or insulating spacer comprising, for example, two layers of reconstituted mica interleaved with a single layer of irradiated polyethylene, the layers of reconstituted mica being disposed adjacent the foil layers 13 and 14 and separating them from the solid film of irradiated polyethylene. Thus the assembly illustrated in FIGURE 2 comprises a top layer 16 of irradiated polyethylene, a sublayer 18 of porous reconstituted mica, a layer 13 of electrically-conducting metal foil, a further layer 20 of porous reconstituted mica, a second layer 22 of irradiated polyethylene, then a layer of reconstituted mica 24, a layer 14 of electrically conductive metal foil and a bottom layer of porous reconstituted mica 26. The thus assembled sandwich 12 is wound in convolute fashion about a round or true-cylinder shaped arbor 28 preferably of a plastic material such as epoxy resin and which is plugged with a strength imparting rigid wooden core 30. Foil layers 13 and 14 represent the high and low potential armatures of the capacitor and therefore are of wide area for maximum capacitance, although confined in a relatively small volume, and are separated by a dielectric complex comprising the porous webbings of reconstituted mica and the intermediate solid thickness or film or irradiated polyethylene. For higher voltage service, the armatures represented by 13 and 14 may comprise several series sections and, as illustrated in FIGURE 2, each of layers 13 and 14 may therefore actually comprise two or more strips of unequal width separated from each other by a spacing equal to 10 to 500 times the total dielectric thickness between the foil layers 13 and 14. Thus, in FIGURE 2 foil layer 13 comprises strips 13a and 13b, strip 13a having its outer margin 32 extending above the periphery of the interleaved layers of reconstituted mica and irradiated polyethylene. Similarly layer 14 comprises adjacently spaced strips 14a and 14b, strip 14a having an outer marginal edge portion 34 extending below the interleaved dielectric spacer. Foil extensions 32 and 34 serve as convenient attachment areas by which the armature constituted foils may be electrically connected to the externally located respective high and low potential electrodes, as will hereinafter be described. Other arrangements of the armature-constituting foils and dielectric spacers may be had. Also dielectric layers of other compositions and arrangements may be utilized. For example, polypropylene or polytetrafluorethylene may replace the irradiated polyethylene or be used in the dielectric complex as an additional solid dielectric film or layer. The aforedescribed assembly of armature foils and dielectric spacer which is set forth in the above-mentioned Hoffman and King application, Serial No. 309,993, is preferred by reason that it provides a capacitor having a low loss factor or a higher Q than can be obtained when, for example, kraft paper is used as the dielectric spacer. Arbor 28 is of a true-round or cylindrical shape as opposed to an oval cross-section, which helps to eliminate sharp folds in the capacitor assembly 12 when wound thereabout. Sharp folds are to be avoided since they have been found to contribute to corona damage, particularly in capacitors operating at high voltage levels, for example, in the order of 60,000 volts and with a frequency range between 30 and 100 kilocycles, for which use capacitors in accordance with the present invention are particularly adapted. Casing 10 is also selected to have a cylindrical shape as well as diameter which will closely conform to the external cylindrical shape of the capacitor assembly. This keeps the amount of dielectric liquid required to a minimum and provides mechanical support to capacitor and greatest strength.

Referring back to FIGURE 1, arbor 28 is preferably longer than the corresponding axial dimension of the convolutely wound capacitor assembly of foils and dielectric spacer so that its ends can protrude slightly at either end of the assembly. This provides space for locating a plurality of straps 36 and 38 of flexible electrically conductive material, such as copper, in radial fashion over the top and bottom ends, respectively, of the capacitor assembly 12 and which can then be enclosed by insulating layers 40 and 42. As shown in FIGURE 5, straps 36 are arranged on the top of the assembly and soldered to the protruding edges 32 of the foil strip 13a. Straps 38 are similarly arranged on the bottom of the assembly and soldered to the protruding edges 34 of the metal foil strip 14a. In a 9-inch diametered capacitor assembly I have found it convenient to so utilize approximately 16 straps, alternate ones extending to adjacent the arbor 28 and intermediate straps more conveniently terminating short thereof as illustrated in FIGURE 5. Although FIGURE 5 is identified as illustrating the arrangement of straps 36 at the top of the capacitor assembly, it will be understood that a view taken of the arrangement of straps 38 on the bottom of the capacitor assembly 12 would be generally similar. The two ends of the capacitor assembly 12 are then built up to flush with the ends of the tubular arbor 28 by locating rings 40 of insulating material such as kraft paper over the protruding end of arbor 28 and are compressed to provide a solid thickness of insulating material at the two ends of the capacitor assembly flush with the outer termination of arbor 28. Straps 36 are brought around the edge of said annular assembly 12 over the top of insulating thickness 40 whereas straps 38 are started up along the outer periphery of the assembly toward the top end thereof. Insulating annular caps 44 and 46 are then placed over the respective ends of the assembly including the thus arranged straps, and taped in place. The space about capacitor assembly 12 between the vertical extensions 44a and 46a of said caps 44 and 46 is thn filled in by wrapping insulating tape 48 about the assembly, exclusive of straps 38, throughout the width thereof to nearly flush with the outer surface of said portions 44a and 46a. Straps 38 are then brought up along the outside of tape 48 and over portion 44a of cap 44 for connection to the low potential electrode 50 as hereinafter described. Straps 38 are held in place by wrapping further tape 52 (FIGURE 4) over the straps about tape 48 and end caps 44 and 46.

Before inserting the thus completed capacitor assembly into container 10, lead straps 36 and 38 are connected to their respective high and low potential electrodes or terminals, as will now be described. Referring therefore now to FIGURES 1 and 7, at 54 is an annular collector plate having a flanged outer peripheral portion 56. At 58 is a flanged washer welded to annular plate 54 and which serves to support tubular guide 60 within the bore 62. The assembly constituting collector annulus 54, flanged washer 58 and guide 60 is located on the capacitor assembly with guide 60 extending into the open upper end of arbor 28 about the appropriately reduced end of core 30 and collector plate resting on insulation layer 40. Flanged portion 56 provides means to which straps 36 are soldered and flanged washer 58 includes vertical portions 64 extending through provided openings in bushing 66 by which electrical contact is established between straps 36 through collector plate 54 to the high voltage electrode 68 which is vacuum cast into the filled-epoxy bushing 66.

Bushing 66 which is of suitable electrically insulating material also supports at 70 a collector ring having radial portions 72 (FIGURE 7) to which straps 38 are electrically connected as by soldering. Over said collector ring 70 spot welded thereto and in electrical contact therewith is cover 74 which is welded to annular-shaped low potential electrode or terminal 76, into which epoxy-filled bushing 66 is vacuum cast. Thus, as described, armature foil 13a has electrical connection with high potential electrode or terminal 68 via straps 36, collector plate 54, and flanged washer 58. The high potential terminal 68 is electrically isolated from the annular low potential terminal 76 by bushing 66 and low potential terminal 76 has electrical connection with the other armature foil 14a via straps 38, collector ring 70 and cover 74. The capacitor assembly 12 thus connected to the high and low potential terminal is then ready for insertion into container 10, the capacitor assembly being inserted so that guide 80 enters the lower end of arbor 28 and about the reduced lower end of core 30 until the assembly comes to rest on supporting wall 82. The flanged periphery 84 is thereby aligned within the upper end of container 10 and welded thereto so as to provide a gas-tight joint sufficiently strong to be resistant to the pressure exerted within the interior of the container and on the dielectric liquid subsequently added to the container after its air evacuation and before sealing.

As shown in FIGURE 1, supporting wall 82 is spaced from the lower end of container 10 and has a downwardly extending flanged periphery 86 which is illustrated in FIGURE 6 as so deflected as to comprise spaced lands 88 engaging with the inner surface of the container 10 and with intervening area 90 through which fluid communication is possible between chamber 92 disposed above supporting plate 82 containing the mentioned capacitor assembly 12 and a second chamber 94 disposed between said supporting plate 82 and the bottom or end closing wall 96. End closing wall 96 is also illustrated as having a flanged periphery but which is welded to the margin of the inner surface of container wall 10 so as to provide a continuous fluid-tight seal thereabout which will be sufficiently strong as to resist the pressure developed within the capacitor. Within chamber 94 is supported an inflatable bladder 98 having a valve 100 extending through an opening provided in the container bottom wall 96 and secured thereto by nut 102. Desirably valve 100 will also be provided with a removable cap 104. Bladder 98 is formed from two circular pieces of resilient Teflon or other inert plastic resilient material having their lapping marginal portions welded or otherwise integrally joined so as to be capable of resisting the pressure developed in said bladder both upon initial inflation and as the pressure thereon changes during operation of the capacitor. I have found that when the two discs comprising the bladder have a diameter of 9 inches, then a peripheral weld of about $\frac{1}{16}$th of an inch is sufficient for this purpose and will resist pressure up to and including 60 p.s.i.g. when bladder is supported inside chamber.

With capacitor assembly 12 placed in container 10, and cover 74 welded by its flanged periphery 84 to the container 10 to produce an air and fluid-tight structure, the capacitor is readied for use by vacuating its air content and filling with an appropriate dielectric liquid such as castor oil. For this purpose, a pair of screw sealed openings are provided at 106 in the top cover wall 74 of the container (FIGURE 7). Once the capacitor case including both chambers 92 and 94 has been evacuated of air, and filled with dielectric liquid, sufficient gas is admitted under pressure through valve 100 to displace a measured volume of the dielectric liquid, screws 106 are tightened and more gas is then admitted through valve 100 under pressure to inflate bladder 98 until the desired pressure on the dielectric liquid content of container 10 has been effected. Although, as will be understood, the pressure to be thus developed on the dielectric liquid within container 10 will vary in accordance with the particular capacitor, its size and requirements, a particularly useful pressure for capacitors of the size and performance rating indicated above will range from 45 to 60 p.s.i.g. Although the volumetric capacity of chamber 94 which contains bladder 98 may be varied, it should be large enough to accommodate the volumetric changes brought about by the expansion and contraction of the dielectric liquid with the heating and cooling of the capacitor. By this is meant that chamber 94 should be greater than the inflated size of bladder 98 by more than the expected volumetric decrease in oil for the lowest operating temperature that the capacitor is expected to encounter wherefore the inflated bladder 98 will be able to exert a hydrostatic pressure of substantially constant value on the dielectric liquid volume and so that the capacitor assembly 12 will be under pressurized dielectric liquid at all times. Also, as the temperature of the capacitor rises above room temperature, the volume of dielectric liquid in container 10 will increase and compress bladder 98 to reduce its inflated volume. Since the bladder is filled with gas under pressure, its internal pressure will change inversely in proportion to its change in volume and so as to maintain its pressure on the dielectric liquid at a substantially constant value. For this reason, the volume of the bladder when inflated, and thereby also the volume of chamber 94 in which it is located, should be so related that the bladder volume is considerably greater than the expected dielectric liquid volumetric change within chamber 94 and so that the increase or decrease in pressure within bladder 98 will be relatively small through all normal conditions and working temperatures. As an example thereof, where bladder 98 comprises two 9 inch discs of Teflon inflated at 45 to 60 p.s.i.g., it has been found satisfactory if chamber 94 has a volume corresponding to a diameter of about 9 inches and a height of 1½ inches.

It will also be understood that the material out of which container 10 and the component parts of the capacitor including its top and bottom ends are constructed will be of materials and thicknesses, and the exterior joints will be sufficiently fluid and air-tight, as to resist the hydrostatic pressure which is developed in the capacitor during its use. Also, although Teflon is the preferred material of which to construct bladder 98, other resilient materials inert to the selected dielectric liquid may be used.

Referring now to FIGURES 9 and 10, a second embodiment of the invention is there illustrated as comprising two capacitor assemblies 112 and 112', each of a construction corresponding to 12. That is to say, each of said capacitor assemblies as shown in FIGURES 2 and 3 embodies a pair of electrically conductive flexible metal foils 13 and 14 separated from each other by a thickness of dielectric solid material which comprises three layers, a center layer of irradiated polyethylene and two layers of reconstituted mica, the reconstituted mica layers being disposed adjacent to the metal foil and spacing them from the center layer of irradiated polyethylene. Each said capacitor assemblies 112 and 112' is convolutely wound about its own plastic core 128 and 128', respectively, and are located within a cylindrical casing 110 of electrically conductive rigid metal from which the two capacitor assemblies are isolated by a protective thickness of kraft paper 114 or other appropriate insulating material. The two capacitor assemblies 112 and 112' are in turn spaced from each other by a thickness of insulating material such as phenolic annular disc 116 and their plastic arbors 128 and 128' are joined together by central wooden core 130 members 132 threaded into the ends thereof which tightly engage the bore wall of said arbor so as to join the two capacitor assemblies 112, 112' and spacer 116 into a unitary structure.

In a fashion similar to that described with reference to the first embodiment (FIGURE 4), foil 13a of capacitor assembly 112 has its protruding edge 32 soldered to radially disposed straps 136 which are of an electrically conductive material such as copper and the exposed protruding edge 34 of its foil 14a is soldered to radially disposed straps 138. Similarly, the exposed edge 32 of foil 13a of the capacitor assembly 112' is soldered to radially disposed copper straps 136' and the protruding edges 34 of foil 14a of the capacitor assembly 112' is soldered to radially disposed copper straps 138'.

As illustrated in FIGURE 9, straps 138 of capacitor assembly 112 and straps 136' of capacitor assembly 112' are soldered together at 140 so that the two capacitor assemblies are effectually in series connection.

Positioned over the top capacitor assembly 112 is the high potential electrode indicated generally at 142 and comprising an upper section 144 and a lower section 146 joined together as by bolts 147. The lower section of 146 of said high potential electrode has an outwardly flared peripheral portion 148 which rests on the top surface of insulating layer 150 and includes a locating portion 152 which is fitted into the open upper end of arbor 128. Flared portion 148 serves as a collector to which the ends of straps 136 are connected as by screw means 153. At 154 is an annulus of appropriate insulating material such as compressed adhesively bonded mica through the bore of which a reduced portion of the lower section 146 of the high potential electrode extends and so annulus 154 is clamped between lapping portions of the upper and lower sections 144, 146 of the high potential electrode by the mentioned bolts. Said insulating annulus 154 functions as a cover for enclosing the upper end of the container 110, its outer periphery resting on the provided ledge in the annular supporting structure 156 which is heat shrunk about the upper end of container 110 and welded thereto as at 158. Annulus 156 also serves as a support to which the low potential annulus or terminal 159 is bolted as at 160. Clamping rings are also provided at 162 and 164 against which the low potential annulus 159 and the upper section of the high potential electrode 142 are respectively drawn by the tightening of screws 160 and 147. Conveniently O-rings may be also located in appropriate recesses as at 168 and 170 in order to obtain a liquid tight seal between cover 154, the high potential electrode 142 and casing 110.

Considering now FIGURE 10 in conjunction with FIGURE 9, the lower capacitor assembly 112' rests on a supporting wall 176 from which it is insulated by thickness 188. Wall member 176 is bolted as at 178 to collector ring 180 which in turn is bolted at 182 to a supporting annulus 184 corresponding to supporting annulus 156 at the top of container 110 which is similarly heat shrunk about the lower edge portion of said container and forms a ledge 186 on which capacitor assembly 112' rests. At 194 is a guide block which is mounted centrally of wall 176 as by screws 195 and which serves to align the capacitor assemblies in container 110. At 190 and 192 are inner and outer annuli constructed of suitable rigid insulating material such as fabric based phenolic sheet which gives support to the bottom of capacitor 112' over space 193 and assures proper ground current path while accommodating straps 138 which are extended through peripherally disposed slots 191 in insulating layer 188, beneath the margin of said insulating layer 188 over annulus 190 and through the provided space therebetween and inner supporting annulus 192 and space 193 to electrical connection by bolts 178 to the mentioned collector ring 180 which establishes electrical connection through supporting annulus 184, container wall 110, and upper supporting annulus 156 to the low potential electrode 159.

Secured to the supporting annulus 184 as by bolts 196 is a bottom cap 198 which in turn is bolted to a supporting pedestal 200 as by bolts 202. Secured to the meeting edge surfaces of supporting annulus 184 and end cap 198 is the margin of a resilient imperforate diaphragm 204 of plastic material such as the aforementioned Teflon, which is inert to the elected liquid dielectric material such as the aforementioned silicon oil or castor oil with which container 110 is to be filled when subsequently air evacuated. An O-ring may be provided at 206 to effect fluid-tight seal between members 184 and 198. Thus, in this second described embodiment of the invention, wall 176 corresponds to wall 82 in the first described embodiment in that it divides the interior of the container 110 into a pair of chambers, the first chamber 207 containing the two capacitor assemblies 112 and 112' and the second chamber 208 which is divided by diaphragm 204 into a reservoir 210 defined therebetween and cap 198 which may be filled under pressure as through valve 212. Reservoir 210 thus corresponds to bladder 98. The second chamber 208 is larger than the inflated size of reservoir 210 and communicates with chamber 207 through ports 214 in wall 176 as well as the space between inner and outer supporting annuli 192 and 190 and the peripheral cutouts 191 in insulating spacer 188. Additional communication for the passage of dielectric liquid between the two chambers 207 and 208 may be provided if necessary. A protective shield of soft aluminum material may be provided at 216 and secured to block 194 as by a screw 218 which will afford protection to diaphragm 204 from possible injury on contact with the heads of screws 178 and 182, for example. At 220 is a screw-sealed opening into the interior of container 110 and at 222 is a second screw-sealed opening which connects with said interior through appropriately directed channels 224, 226 and 228 through the lower section 146 of the high potential electrode. Either of said openings, 220 or 222, serves for the admission of dielectric liquid into the container as its air content is evacuated through the other, so the total volume of the capacitor not occupied by the capacitor assemblies proper and/or the reservoir 210 can be filled with oil. On the complete evacuation of air and filling with dielectric liquid, sufficient gas is introduced through valve 212 to displace a determined amount of dielectric liquid, the screws in said openings are tightened to seal the container 110, after which gas is admitted through valve 212 in quantity sufficient to introduce the desired pressure on the dielectric liquid. It will of course be understood that as in the first described embodiment of the invention volume 214 of chamber 208 is made large enough to accommodate the displacement of the resilient wall 204 with lowering of the temperature in the capacitor. At the same time reservoir 210 is also sufficiently large to accommodate the displacement of volumetric changes brought about by the expansion of the dielectric liquid with the heating or raising of the temperature of the capacitor, also that its total volume will be considerably greater than the expected liquid dielectric volumetric change so that the increase in pressure in reservoir 210 will be relatively small for all normal conditions and operating temperatures.

It will thus be apparent that all of the recited objects, advantages and features of the invention have been demonstrated as achievable in an entirely practical and economical construction. It will furthermore be understood that the aforedescribed embodiments are to be considered merely as illustrative of the invention and that many variations as well as arrangements of the parts comprising the capacitor units may be had all within the spirit of the invention as defined by the appended claims. For example, although the two described embodiments of the invention have been described as employing a high potential terminal in the form of a centrally located cylindrical block surrounded by a low potential electrode in annular form and which is isolated from the high potential terminal by a bushing or other member enclosing the top of the container, the two electrodes or terminals might be located on opposite walls or in any other appropriate location. Also an optional charging terminal could be located on one end of the container and connected to the high potential terminal through the arbor, for which purposes core 30 or 130 would be omitted or provided with a bore therethrough.

Thus having described the invention, I claim:

1. A capacitor comprising an air-evacuated container containing a pair of cooperating armatures separated by thickness of dielectric material adjacent one end and a gas-filled collapsible chamber adjacent the other end thereof, said container furthercontaining dielectric liquid covering said armatures and thickness of dielectric material and in contact with said collapsible chamber, the gas content of the collapsible chamber being under pressure greater than 1 atmosphere, so as to exert a corresponding pressure on the dielectric liquid of the container, said dielectric liquid volumetrically expanding with temperature increases in the capacitor during the operation thereof, and said gas-filled collapsible chamber accommodating said volumetric changes of the dielectric liquid to maintain a substantially constant hydrostatic pressure on the dielectric liquid.

2. A capacitor comprising a sealed container having a rigid outer wall and a ported wall dividing the interior of said container into a pair of communicating chambers, a pair of spaced cooperating armatures supported in one of said chambers, a gas-filled reservoir incompletely occupying the other chamber and including a resilient wall, the remaining volume of the two chambers being completely filled with dielectric liquid, the gas within said reservoir exerting a pressure greater than one atmosphere on said dielectric liquid through its resilient wall, the dielectric liquid volumetric expanding with temperature increases in the capacitor during the operation thereof and the resilient character of the wall accommodating said increase in the volume of the dielectric liquid as the temperature of the capacitor rises during operation, said reservoir thereby maintaining a substantially constant hydrostatic pressure on the dielectric liquid.

3. A capacitor comprising a fluid-tight container having a rigid outer wall supporting an externally located high potential terminal and an externally located low potential terminal in electrically isolated relation, the interior of said container being divided by an intermediately disposed rigid wall into a pair of communicating chambers, a pair of spaced cooperating armatures supported on said rigid wall in one of said chambers, one of said armatures being electrically connected to the high potential terminal and the other armature to the low potential terminal and a gas-filled reservoir incompletely occupying the other chamber, the remaining volume of said two chambers being occupied by a dielectric liquid, said gas-filled reservoir including a gas and fluid impermeable resilient wall in contact with a displaceable volume of the dielectric liquid, the gas within said reservoir thereby exerting a pressure on said dielectric liquid through its said resilient wall, and the resilient character of the wall accommodating an increase in the volume of the dielectric liquid as the temperature of the capacitor rises during operation, said reservoir thereby maintaining a substantially constant hydrostatic pressure on the dielectric liquid.

4. A capacitor comprising a fluid-tight rigid casing having an intermediately-disposed, transversely extending wall dividing its interior into a pair of adjoining but separate cylindrical-shaped chambers, and means providing communication between said chambers, said capacitor further having an externally-located high potential terminal and an externally-located low potential terminal, a convolutely-wound capacitor assembly in one of said chambers and nearly filling the volume thereof, said capacitor assembly embodying a pair of armature-constituting flexible metal foils and a separating spacer layer of dielectric solid material, one of said foils being electrically connected to the externally-located high potential terminal and the other foil being electrically connected to the externally-located low potential terminal, a gas-inflatable bladder of resilient, gas and fluid impermeable material located in the other chamber, and valve means connecting said bladder externally of the casing to permit inflating the bladder with gas under pressure, said bladder being inflated with gas to occupy a volume smaller than that of said chamber in which it is located, the remaining volume of said two chambers not occupied by the capacitor assembly and bladder being filled with dielectric liquid, said bladder being inflated with gas sufficiently to exert a hydrostatic pressure of several atmospheres on said dielectric liquid, and said gas-inflated bladder being adapted to contract and further expand to accommodate volumetric changes of the dielectric liquid in response to temperature changes in the capacitor so as to maintain a substantially constant hydrostatic pressure on said dielectric liquid.

5. A capacitor comprising a fluid-tight rigid casing of generally cylindrical shape having an end wall provided with a centrally-disposed high potential terminal and a surrounding annular-shaped low potential terminal in electrically isolated relation with each other, an intermediately-disposed, transversely extending rigid wall dividing the interior of said casing into a pair of adjoining but separate cylindrical-shaped chambers, and means establishing communication between said two chambers, a capacitor assembly supported in one of said chambers on said transversely-extending rigid wall and nearly filling the volume of said chamber, said capacitor assembly embodying an axially-directed central core aligned with said high potential terminal and a pair of armature constituting flexible metal foils separated by a thickness of dielectric solid material convolutely wrapped about said core and substantially filling the cross section of said chamber, the edges of one of said foils protruding above the convolutely wrapped dielectric material and the edges of the other foil protruding below the convolutely wrapped dielectric material, a first set of straps electrically connecting the upwardly protruding edges of the first foil to one of said terminals and a second set of straps electrically connecting the lower protruding edges of the other foil to the other of said terminals, a gas-filled bladder of gas and fluid impermeable material located in and partially filling the other chamber, and valve means in the casing connecting with said bladder to permit inflating the bladder with gas under pressure from external of the casing, the remaining volume of said two chambers not occupied by the capacitor assembly and bladder being filled with dielectric liquid, said bladder being inflated with gas sufficiently to exert a hydrostatic pressure on said dielectric liquid, said dielectric liquid fully impregnating said capacitor assembly and defining a displaceable volume in the second chamber adjacent said bladder, and said gas-inflated bladder being adapted to contract and further expand to accommodate volumetric changes of the dielectric liquid within said second chamber in response to temperature changes in the capacitor so as to maintain a substantially constant hydrostatic pressure on said dielectric liquid throughout the interior of the capacitor.

6. A capacitor comprising a fluid-tight rigid casing having its interior divided by an intermediately-disposed, transversely extending wall into a pair of adjoining but separate chambers, said capacitor further having an externally-located high potential terminal and an externally-located low potential terminal, a convoluted capacitor assembly disposed in one of said chambers on said wall, said capacitor assembly embodying a pair of armature-constituting flexible metal foils and a separating spacer layer of dielectric solid material, one of said foils being electrically connected to the externally-located high potential terminal and the other foil being electrically connected to the externally-located low potential terminal, a non-porous resilient diaphragm secured within said other chamber and extending transversely thereacross to define an expandable reservoir between said diaphragm and the end of the casing, and valve means in the casing wall connecting with said reservoir to permit filling said reservoir with gas under pressure, said other chamber having communication through the wall with the first chamber, the interior of the casing not occupied by the capacitor assembly and reservoir being filled with dielectric liquid, said reservoir containing a quantity of gas sufficient to exert a hydrostatic pressure of several atmospheres on said dielectric liquid, and said resilient diaphragm accommodating volumetric changes in the dielectric liquid in response to temperature changes in the capacitor so as to maintain a substantially constant hydrostatic pressure on said dielectric liquid.

7. A capacitor comprising a fluid-tight rigid casing of generally cylindrical shape having an end wall provided with a centrally-disposed high potential terminal and a surrounding annular-shaped low potential terminal in spaced electrically isolated relation with said high potential terminal, an intermediately disposed, transversely extending ported rigid wall spaced from said end wall dividing the interior of said casing into a pair of adjoining but separate cylindrical-shaped chambers, a capacitor assembly supported in one of said chambers on said transversely-extending rigid wall and occupying less than the full volume of said chamber, said capacitor assembly embodying an axially directed central core aligned with said high potential terminal and a pair of armature-constituting flexible metal foils separated by a thickness of dielectric solid material convolutely wrapped about said core, the edges of one of said foils protruding above the convolutely wrapped dielectric material and the edges of the other foil protruding below the convolutely wrapped dielectric material, a first set of straps electrically connecting the upwardly protruding edges of the first foil to one of said terminals and a second set of traps electrically connecting the lower protruding edges of the other foil to the other of said terminals, a non-porous resilient diaphragm secured within said second chamber and extending transversely thereof to define a gas-fillable reservoir between said diaphragm and the other end of the casing, valve means in the casing wall communicating with said reservoir to permit filling the reservoir with gas under pressure from external of the casing, the remaining volume of said two chambers not occupied by the capacitor assembly and reservoir being filled with dielectric liquid, said dielectric liquid thereby defining a displaceable volume in the second chamber between said rigid transversely extending wall and diaphragm, and said reservoir containing a quantity of gas sufficient to exert a hydrostatic pressure on said dielectric liquid, said resilient diaphragm being adapted to contract and further expand to accommodate volumetric changes of the dielectric liquid within said second chamber in response to temperature changes in the capacitor so as to maintain a substantially constant hydrostatic pressure on said dielectric liquid throughout the interior of the capacitor.

8. A capacitor comprising a fluid-tight rigid casing of generally cylindrical shape having an end wall provided with a centrally-disposed high potential terminal and a surrounding annular-shaped low potential terminal in spaced electrically isolated relation with each other, an intermediately disposed, transversely extending rigid wall dividing the interior of said casing into a pair of adjoining but separate cylindrical-shaped chambers, and means establishing communication between said two chambers, a capacitor assembly supported in one of said chambers on said transversely-extending rigid wall and nearly filling the volume of said chamber, said capacitor assembly embodying an axially-directed cylindrical shaped expansible core aligned with said high potential terminal and a pair of armature-constituting flexible metal foils separated by a thickness of dielectric solid material convolutely wrapped about said core, and means located in the ends of said core which slightly expand the core so as to hold the wound foils and dielectric thickness in place, the edges of one of said foils protruding above the convolutely wrapped dielectric material and the edges of the other foil protruding below the convolutely wrapped dielectric material, means electrically connecting the upwardly protruding edges of the first foil to one of said terminals and a second means electrically connecting the lower protruding edges of the other foil to the other of said terminals, a gas containing expandable and contractible reservoir located in and partially filling the other chamber, and valve means in the casing wall communicating with said reservoir to permit its filling with gas under pressure from external of the casing, the volume of said two chambers not occupied by the capacitor assembly and reservoir being filled with dielectric liquid, and said reservoir being filled with gas sufficiently to exert a hydrostatic pressure on said dielectric liquid, and said reservoir contracting and expanding with volumetric changes of the dielectric liquid within said second chamber in response to temperature changes in the capacitor so as to maintain a substantially constant hydrostatic pressure on said dielectric liquid throughout the interior of the capacitor.

9. A capacitor comprising a generally cylindricallyshaped casing having an end wall provided with a centrally-disposed high potential terminal and a surrounding annular-shaped low potential terminal in spaced electrically isolated relation with said high potential terminal, said low potential electrode having electrical connection to the casing wall, a ported rigid end wall closing the opposite end of said cylindrical casing, and annular means securing said ported end wall to the casing, a capacitor assembly supported in said casing on said ported end-closing wall and nearly filling the volume of said chamber, said capacitor assembly embodying an axially-directed central core of insulating material secured at one end to said high potential terminal and to the end-closing wall at its opposite end, at least a pair of armature-constituting flexible metal foils separated by a thickness of dielectric solid material convolutely wrapped about said core, the edges of one of said foils protruding above the convolutely wrapped dielectric material and electrically connected to said high potential terminal, the edges of the other foil protruding below the convolutely wrapped dielectric material, and electrically connected by means including the casing wall to said annular low potential terminal, a non-porous resilient diaphragm stretched across said annular means securing the ported end-closing wall to the casing, and a cap secured to said annular securing means forming a sealed reservoir on the side of the diaphragm opposite the end-closing wall of the casing, and valve means in said cap through which the reservoir may be filled with gas, the interior of the casing and the space between the end-closing wall of the casing and the diaphragm communicating therewith being filled with dielectric liquid so as to fully cover all live parts of the capacitor and eliminate voids, said reservoir being filled with a quantity of gas sufficient to exert a hydrostatic pressure on said dielectric liquid, and said resilient diaphragm being adapted to contract and further expand to accommodate volumetric changes of the dielectric liquid within said casing in response to temperature changes in the capacitor so as to maintain a substantially constant hydrostatic pressure on said dielectric liquid throughout the interior of the capacitor.

10. A capacitor as claimed in claim 9 wherein the diaphragm is of resilient plastic material and the capacitor further has a perforated protective shield of soft metal disposed between said rigid end-closing walls, its securing annular means and the diaphragm.

References Cited by the Examiner

UNITED STATES PATENTS

| 2,454,962 | 11/1948 | Broan | 174—12 |
| 2,568,422 | 10/1951 | Wald | 174—12 |
| 3,024,393 | 3/1962 | Ferrante | 317—242 |

FOREIGN PATENTS

| 517,718 | 2/1940 | Great Britain. |
| 635,541 | 4/1950 | Great Britain. |

ROBERT K. SCHAEFER, *Primary Examiner.*

JOHN F. BURNS, *Examiner.*

E. GOLDBERG, *Assistant Examiner.*